A. C. TWINING.
Methods of Freezing and Cooling.
No. 146,620. Patented Jan. 20, 1874.
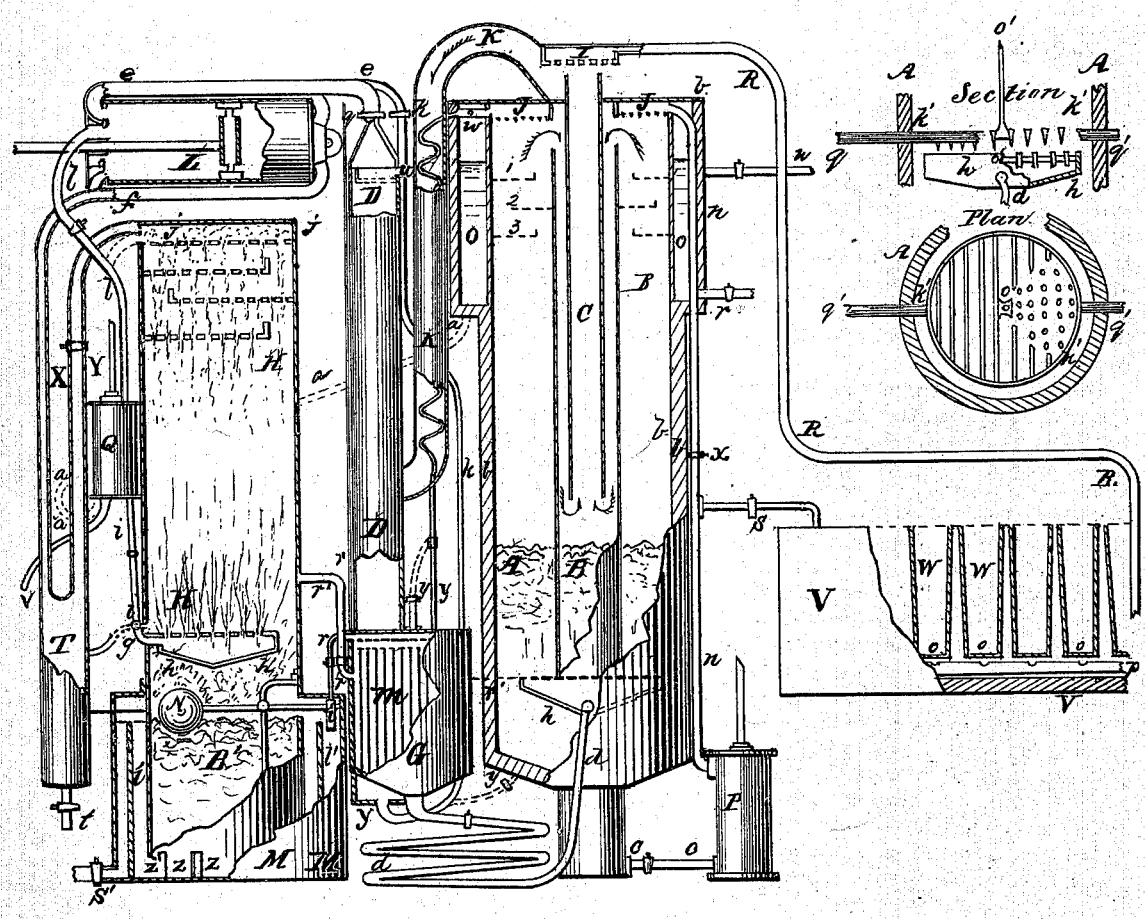
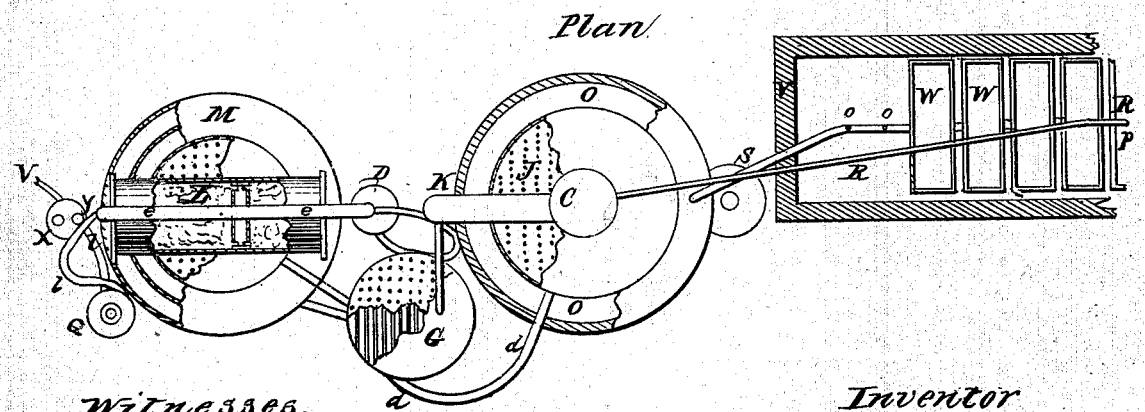

UNITED STATES PATENT OFFICE.

ALEXANDER C. TWINING, OF NEW HAVEN, CONNECTICUT.

IMPROVEMENT IN THE METHODS OF FREEZING AND COOLING.

Specification forming part of Letters Patent No. 146,620, dated January 20, 1874; application filed November 22, 1869.

*To all whom it may concern:*

Be it known that I, ALEXANDER C. TWINING, of the city and county of New Haven and State of Connecticut, have invented a new and Improved Method in Freezing and Cooling; and I do hereby declare that the following is a full and exact description thereof, reference being had to the accompanying drawings and to the letters of reference marked thereon.

In all plans preceding this application for refrigerating a fixed or uncongealable liquid by the evaporation of a volatile liquid, the latter is evaporated in a tight separate vessel or system of pipes by exhaustion of some sort, and the former liquid is cooled by contact with the vessel or the pipes on their outer surfaces. I herein propose to dispense with the pipes, sheets, or plates which separate the two liquids, as above, and thus to simplify and economize construction, and likewise to promote immediacy and energy of cooling, by having the two liquids in contact or conjunction, while the volatile one is in process of evaporation by a pump or other apparatus for exhausting or removing the vapor as fast as generated. For this purpose I employ, as the liquid to be refrigerated, water, either, as the case may be, pure or holding common salt or other suitable salt in solution, and, if found expedient, a little alcohol added. But, for the volatile liquid, I employ, for example, the sulphuret of carbon, being the liquid designated chemically by the symbol $CS_2$, and which is nearly one-third heavier than water, and boils at 110° Fahrenheit; or, for other examples, I employ volatile oils of the class patented in 1846, in France, by E. Bourgois, for the general purpose of refrigerating by their evaporation, and by him designated as "les carbures d'hydrogene," or the hydrocarbons, such as butyl ($C_8H_9$) or hydride of butyl, ($C_8H_{10}$,) or a mixture of the two, or others of that class. These are lighter than water, and boil near down to its freezing temperature or below it; also, like the sulphuret of carbon, they are wholly insoluble in water, or, in certain instances, but very sparingly soluble. Whenever, in what herein follows, a volatile liquid is described as "not soluble," or as "insoluble," in water, salt-water, &c., absolute insolubility is not necessarily, in every such instance, intended, but only to a degree sufficient for the purpose and as designed. Volatile liquids which are not insoluble, at least, to such a degree are excluded from this specification; but, on the other hand, the plan specificed embraces any and all that experience shall show to be adapted to it. Again, the condensers, restorers, or liquefiers employed in ice-machines for restoring to a liquid condition the vapors of the volatile liquids employed have heretofore consisted of pipes or coils surrounded and kept cool by flowing cold water. I propose herein to dispense with these pipes or coils, and to throw the vapor, under a suitable compression or tension, into the condenser to be commingled or in contact with the flowing cold water, or a shower or descending sheets thereof. By this I simplify and economize construction, and also promote immediacy and energy of condensation. The restored volatile liquid, being insoluble in the water, will separate from it, and may be drawn off and preserved.

The above are main features of my plan, but there are subordinate devices to facilitate the performance. I now proceed to explain my invention in detail, having reference to the accompanying drawing, in which the first or upper figure on the left is a vertical section and side view; but the second or lower figure is a ground plan or view; and the third or upper right-hand figure is an auxiliary section and plan of certain parts to be herein specified.

In the drawing, A C is the evaporating or cooling vessel, from which the pump L, as shown, is drawing out the vapor through K K, in the direction of the arrow. H H is the condenser or restorer, into which L collects or compresses the vapor from A C, which is therein restored to a liquid condition, as will be further described, and escapes into a receiving-vessel, G, where it will be cooled by partial evaporation, effected by means hereafter to be explained. This recondensed liquid in G is forced, by its own head and the pressure or tension in G, through the coiled pipe $d$, into the under side of the colander $h\ h$; or, otherwise, without passing through G, it may be forced, by the superior tension in H, through the conduit $r'\ r$, into the same colander $h$. In either case, it spurts up through very numerous and minute orifices from the upper surface of that colander into the vessel or into the mass of salt-water, (that last being taken as the type of all suitable liquids uncongealable at the temperatures employed,) as shown at A B, and below it. The volatile liquid is thus made to commingle intimately with the salt-water. In case the sulphuret of carbon is the liquid, its globules will settle slowly through the salt-water, but all the while giving off vapor under the pump's exhaustive—that is, drawing out—action, and abstracting heat from the liquid medium with which it is commingled in contact; but if a liquid lighter than salt-water—such, for example, as hydride of butyl—is thus commingled and evaporated, its globules will slowly ascend while evaporating, and so cool the mass. Ordinarily, in this form of the operation, the intention might be so to adjust the quantity injected that the whole should be volatilized within the uncongealable mass, or nearly so. During rapid action the refrigerated medium will be put into a commotion like ebullition by the escaping vapor. However, there is a modified form of this peculiar operation indicated in the drawing. In this the volatile liquid is supposed to be forced up from G, through the branch $y$ (shown in broken lines) of the coiled pipe $y\ w$, and to enter an upper colander, J J, and be showered down in union with the salt-water received into the same through $n\ n$ or R. It will be understood, in all that herein follows, that the volatile liquid employed is lighter than water, unless the contrary is expressly stated.

The cooled salt-water settles into the lowest part of the cooling-vessel. Thence the circulation-pump P draws it through the regulated pipe $c\ c$, and forces it up through $n\ n$—also regulated by the cock $x$—into the top of the cooling-vessel, and into a colander, J J, which may be shaped like a circular ring, and pierced at bottom with very numerous and minute perforations. Ranged below this the drawing shows other like colanders in a series, as 1 2 3, into and through which successively the salt-water falls. The escaping vapor impinges upon it and abstracts heat during the descent. To prolong and add to this cooling effect of the vapor, there is a sheet-cylinder, B B, concentric with A C, and the vapor turns over its top, as shown by the arrows, and passes downward in union with a portion of the uncongealable liquid discharged from J J. This channel of descent lies between B B and a short central sheet-cylinder, C, which causes the vapor to turn into its lower opening between itself and the surface $b\ b$ of the salt-water, as shown by arrows in the drawing. This last cylinder conducts directly into the discharge-pipe K, already described. If the volatile liquid is supplied in excess, so that a mass of it floats to a considerable depth upon the salt-water, or above A B, the descending showers from the colanders J J, &c., will surrender heat to the volatile liquid in quantity to produce and be absorbed by the consequent evaporation of the latter. But, in fact, the mechanic can introduce $n\ n$ or R R, for discharging a stream of salt-water in mass to any part of A C he may choose, or can, if he prefers, supply the volatile liquid so abundantly that it shall constitute the chief mass of liquid lying below A B or $b\ b$, and which envelops $h\ h$; and, in harmony with this, the pipe $n$, instead of conducting to J J, may pierce the side or shell of A C to the left hand of P, and be prolonged to enter $h\ h$, and so the salt-water will be injected up into the volatile liquid, instead of the latter being injected into the former. In short, any variation of apparatus or combination of parts which commingles intimately the salt-water and the volatile liquid during evaporation of the latter, or affords during the same evaporation a contact of the two liquids for the absorption of heat from the one by the evaporation of the other, fulfills the purpose and operation, and embodies the principle, of my invention, in this cold-producing function of it. The upper right-hand drawing shows an "auxiliary" for this intimate commingling and contact, to be explained further on.

The main use of the salt-water or uncongealable liquid, so called, I come now to explain. First, let it be observed, that the salt-water, when refrigerated, is to be employed for making ice by circulating in a trough and around vessels containing the water to be frozen, essentially in manner as explained in my own patent of April 15, 1862, and previously described, with a reservation in my original or fundamental patent of 1853.

In the drawing, V V is one of the troughs, and W W, &c., are water-vessels for the freezing cakes. In a vacancy beneath these vessels there is a chest or pipe, or pipes, $p$, opening by the conduit $s$ into $n$. By turning the regulating-cock $x$, the pressure between itself and P may be made sufficient to drive a partial current of salt-water out of $n$ into $s$, its cock being open, thence into $p$, and through the holes $o\ o$, to impinge upon the bottoms, and circulate around the sides of W, and to issue into R R, that being the only open exit from the trough. By this last pipe the same is conducted into the colander I, and falls down in a shower through the vapor ascending by the central cylinder, as above described; or, by shutting $x$ and opening $s$ entirely, and introducing R R into J J, as well as into I, the entire mass may be made to circulate through V, and be showered down by I and J J through the vapor.

The mode and means of condensing this vapor to a liquid after its being drawn from A C forms another and distinct part of my invention; but I defer it for opportunity first to explain the upper right-hand or auxiliary figure of the drawing.

As the distinction between the foregoing and anything heretofore known or used in the art to which my invention belongs is distinct and unmistakable, especially in the respects first above pointed out, so it is equally clear, from the explanation of the invention thus far, that it will perform the better, in all the foregoing, the more intimately and minutely the volatile liquid shall be comminuted into drops and commingled with the salt-water or uncongealable liquid, and vice versa. The figure last mentioned shows a section of the colander $h\ h$ within the cooling or evaporating vessel A or A C. It also shows, close above it, a grating, with bars $h'\ h'$ and interstices, and a stem, $q'\ q'$, fixed to the ring of the grating, and piercing the sides or shell of A.

When $q'\ q'$ is moved with a rapid alternate or reciprocating motion over or across the orifices of $h\ h$ it cuts and comminutes the jets issuing from those orifices, and also commingles them intimately in drops with the liquid which envelops $h\ h$, as described, in the lower part of A C; or the same object may be effected by giving the grating a rapid revolution upon a vertical axis, $o'$; or, if the grating is stationary, and $q'$ is attached to $h\ h$ instead of it, and the reciprocating motion is thus given to the colander, the effect will be the same; and so, also, if the vertical axis shown is continued down and attached to $h\ h$, and the latter be put into revolution, while the grating is fixed, the effect will be the same as described.

I now describe the mode and means above referred to for condensing the vapor of the volatile liquid generated in A C, and escaping or drawn off by the pump L from that cooling-vessel. This vapor, as shown, passes down K K into a vertical vessel, D D, and thence up into the inlet-pipe $e\ e$ of the double-action pump L. It may here be mentioned that, on its way through K, it impinges against the coils of an ascending pipe, $y\ w$, through which pure water is slowly conducted up to the two-way cock, $w$, and through that cock, properly turned, into the reservoir O O. This last is designed for containing the water to fill the vessels W. This water, entering cool through $w$, is further cooled by contact with the cold upper part of the shell of A, and may be drawn off by the cock F, shown on the right hand. The cylinder D D is supernumerary, but may subserve a valuable use in case the volatile liquid employed is absolutely insoluble in water; for the pure water to be frozen may be pumped, through $u\ u$, into the colander shown at top; and, being showered through the cold ascending vapor, will settle in a cooled condition, at and above $y$, on the bottom. For want of room in the drawing, this is shown so low in position as would necessitate a mechanical forcing of the water up through $y\ w$ into O; but, in actual construction, it would, if employed, be placed so high that the water would flow into that reservoir by its own head; and, in fact, the operation which is now to be described is not affected by the question whether the vapor is drawn into L through K and D, or is taken through $e\ e$ directly from the top of the evaporating-vessel A. The vapor which L has taken in by its exhaust stroke will be of less than atmospheric tension, or of greater than atmospheric tension, according to the particular liquid and the temperature. Either way, it is forced, by the corresponding return stroke, into the air-tight condenser or restorer H, through the exit-pipe $f\ f$. In fact, this pipe is shown as prolonged down by X, and, turning up again by Y to the top of H, it discharges there the vapor into that vessel. At the same time the force-pump Q draws in the natural cooling-water through $v$, and throws it through $i\ i$ into the colander $h'\ h'$, and spurts it up in spray into the compressed vapor within H. The spray, being forced into contact with the compressed vapor, condenses it to a liquid, and falls down with it, thus condensed, to the mass B' collected at the bottom. The volatile liquid rises and floats atop, while the warmed cooling-water escapes, or may be pumped out beneath through the regulation-cock $s'$; but lest it should carry off with it some small amount of the condensed liquid, I surround H at bottom by a chest, M, into which the waste water flows before being discharged through bottom orifices $z$, and a partition, $l'$, is interposed, over the top of which the waste water flows on its way down again to the bottom—all this affording opportunity for minute drops to separate from the water, and float, and re-enter H through suitable openings—and of such partitions there may be any necessary number; or, by shutting the cock of $i$, the water from Q may be forced up $l$ and the pipe turning to the right, which is shown by broken lines entering the top colander $j\ j$. Next, it will be showered down through that and a series of colanders ranged successively below it, thus falling through and condensing the vapor, and settling with it, as before, into M. The pipe $l\ l$ has yet another use, and is accordingly drawn as having an entrance at both heads of the pump L; but during and for the particular use just described it is shut off from that pump by closing the cock shown, and likewise is opened by another cock into the pipe which leads to $j\ j$.

Any combination by or through which the pump L or other compressing apparatus brings the compressed vapor into intimate and minute commixtion or contact with the cooling-water from Q will perform the office, and fulfill the object and operation of my invention, equally with the above-described parts and arrangements, in its above function of recondensing the vapor to a liquid. For example, the colanders $h'\ h'$ may be detached from the water-conduit $i\ i$ and dropped to the lower part of H, and there be attached to and entered by Y, which will have been turned downward accordingly. By this L will discharge its contents directly into $h'\ h'$, and, through the minute orifices of the latter, into the cooling-water, and the vapor become condensed. In this condensed or liquid condition it will be collected and utilized in manner essentially as in the form of operation first described. Moreover, the comminution and commingling, through the water, of the vapor bubbles may be promoted and completed, if so desired, by the reciprocating or revolving apparatus figured in the upper right-hand auxiliary section and plan, and already described.

The distinction between the foregoing and anything before known or used in the art of refrigeration or freezing is palpably this, that heretofore, in machines where a liquid is volatilized for the production and application of cold, its vapor has always been recondensed by compression within a separate vessel or coil, or system of pipes, on the outer surface of which cold water was kept suffused or flowing, whereas in my invention the cold water is thrown into the vessel itself and commingled with the compressed vapor, so as to abstract its heat, not through an intervening metallic sheet or plate, but by direct contact with or upon it, in this way reducing first cost of construction, affording, in a moderate compass, a great surface of contact and consequent action, and energizing condensation by the immediate and direct abstraction of heat without the resistance and enfeeblement consequent upon conduction through an intervening substance. Although I have herein claimed this process or system of operation only for the purpose described, yet I reserve other claims and uses of it for a patent hereafter to be applied for.

For returning the condensed vapor to the cooling-vessel A, to be used over again, the pipe $r' r$ is made to pierce the shell of the condenser or restorer and project its inner extremity beneath the surface of the floating volatile liquid. This entrance into that liquid should be at a tranquil part of the mass, protected equally from the ascending jets and the descending drops or sheets. The conduit referred to conducts into the colander $h h$ through a regulation-cock, and the excess of tension or pressure in H will ordinarily suffice for the projection of the jets upward, as first described; but, entering the colander thus, the volatile liquid will be relatively warm, and the cooler G is contrived for a preliminary lowering of its temperature. This vessel is tight, and has a colander across its top and a system, $m$, of vertical cloths or sheets upon which the colander discharges its liquid. This last it receives from H or M, through the entering pipe $i r r$; and the flow into and through this pipe is regulated and equalized by a sliding socket, partially uncovering an orifice at $i$ in $r r$, and worked by the float N and lever N $i$. From the interior of G the exit-pipe $k k$ opens into the inlet-pipe $e e$ of L, and has its cock $k$ automatically opened by the rod $q r$ (worked by the engine of the machine) at the beginning and during a regulated small part of the exhaust strokes of L, at the end of which fraction of either stroke $k$ again closes. This same movement of $q r$ which opens $k$ also opens $i r$ at the cock $r$, and thus opens M to G, but it simultaneously closes the cock $q$, and so shuts off, for the time, D K and the vessel A from the pump L. During that brief time the main pump's evaporating effect goes on within G and cools the volatile liquid as it runs down the cloths or sheets $m$. Thus cooled, that liquid settles into the coiled pipe $d$, and, through it, is pressed into $h h$ and projected from it in jets, as first above described, by the pressure in G. This pressure, although momentarily enfeebled by and during the exhaustive action of L within G, is re-established by opening the latter through $r' r$, automatically, to the gas or vapor in H, so soon as $k k$ and $i r$ are reclosed, and $q$ is reopened, and consequently the normal action of L upon or in A restored. The automatic vapor communication between G and H is represented by $r' r$ and the cock of $r r$ continued through $r' r$ upon one and the same stem, so that when $q r$ opens the liquid-duct $r r$ it closes the gas-duct $r' r$, and vice versa. The vapor entering G does not essentially restore heat to the volatile liquid cooled therein, because the latter, as above described, has settled into the capacious coil $d$, and is there isolated. This coil should be protected by a non-conducting covering, in like manner as A C is shown so protected by its casing $b$, and the same of all refrigerated parts. This method of employing the partial action of the main pump is applicable to all cases where a volatile liquid, evaporated by a pump, is returned recondensed by cold and pressure to the evaporating-vessel, as A, of an ice-machine. Its effect is to curtail the amount of action necessary in the last-named vessel, and to assist mechanical action, more or less, of the main pump. The cloths or sheets $m$ are not essential, except to contract G in size by affording an advantageous exposure; but a mere injection into that vessel, or the mere presence in it of the volatile liquid, will be enough without $m$; nor would it alter the substance of this part of the invention if a comparatively small pump with rapid strokes were substituted for or added to L, but with such automatic attachments that a single full stroke out of a specific number of the smaller pump should take the place of the fractional stroke, as described, of the larger.

In such cases, also, the mechanical labor of the pump may be yet further relieved in the manner following, viz: The water-pump Q is so furnished as to throw cold water, during part of its stroke, through the pipe $l l$; or else a small force-pump may be separately used for the purpose. It injects through $l l$ into each end of L alternately during its reciprocating action, beginning to inject the water into the compressed vapor just so soon as the compression shall have reached the degree of tension at which the injected cold water will begin to condense it, or to absorb its sensible heat, and ceasing to inject a little before the compressing or forcing stroke is completed, or, in other words, is come to the dead-point. The uncondensed and the condensed vapor and the injected water will together be expelled through $f f$ and X. The water will settle into the vessel T, and escape through the cock $t$. The volatile liquid will float, and discharge itself into H through $g$; but the uncondensed vapor will find its way into H through Y, as before described. The same precautions as already described for the condenser H, and shown in and by the chest M, against any part of the condensed vapor being carried off by the waste-water, may be taken, if necessary, for T. The same will also be in place at the bottom of A C, if there required.

In case the sulphuret of carbon is employed for the volatile liquid, or any other volatile that is heavier than water, then the waste-pipe $t$ must be lifted to a place as nearly up to the surface of the water in T as is otherwise expedient, while $g$ must be depressed nearly or quite to the bottom of the volatile liquid collected beneath the water. In that case, also, the discharge-pipe $c\ c$ must be raised from the bottom of the evaporating-vessel to the upper part of the salt-water or uncongealable liquid, and a corresponding alteration must be made in the place or level of the discharge-pipe $s'$. At the same time, the pipe $r\ r$ must lead into G from the bottom of M, instead of from its upper part, and the orifices $z$ and diaphragm $b'$ must be constructed with modifications, which the foregoing descriptions will sufficiently and obviously suggest and dictate.

What I claim, and desire to secure by Letters Patent, is the following:

1. The combination of a pump or other exhausting or evaporating apparatus with an evaporating or cooling vessel containing a liquid uncongealable at the temperatures employed, and also containing a volatile liquid not soluble in the former, and not isolated from it by a containing-vessel or pipes, but commingled or in contact therewith, and, in that condition, cooling the uncongealable liquid by its evaporation, produced by the pump or apparatus first mentioned, all substantially as and for the refrigerating purpose described; and the same pump or apparatus, with cooling-vessel and uncongealable and volatile liquids, in combination with the circulation-pump P and the colander $h\ h$ or J J, or both, or any substantially the same, and for the purposes described.

2. A condenser or restorer into or within which cold water flows, or is injected or showered, in combination with a pump or apparatus, by which the vapor of a volatile liquid is compressed or collected into the same, and in commixtion or contact with the cold water, and, in that condition, condensed to a liquid by the cold and pressure, all substantially as and for the purpose of condensation described; and, in combination with the same condenser and pump or apparatus so performing, the colander $h'\ h'$ or $j\ j$, or both, or any performing substantially as described.

3. The combination of a colander and the auxiliary bars or grating, or any substantially the same, used with a reciprocating or rotary motion in the cooling-vessel or the condenser, for the more intimate commixtion of the volatile liquid or its vapor with the other liquids employed, substantially as described.

4. The employment, in any refrigerating or freezing machine, of a receiving-vessel, interposed on the way from the condenser to the evaporating-vessel, to collect the condensed vapor of a volatile liquid from the former, and deliver it to the latter after a partial evaporation, by the action upon it of a pump or evaporating apparatus connected with and opening into the receiving-vessel; also, the automatic rods and cocks, or other cut-offs, in combination with the above receiving-vessel and evaporating-pump, to utilize a partial stroke of the latter, or a single full stroke among many for evaporation in the former, all substantially as described.

5. The employment and arrangement of orifices and diaphragms in the chest M, or any substantially the same, for insuring complete separation of the volatile liquid used in any vessel of a refrigerating or freezing machine from the uncongealable liquid or cooling-water escaping or drawn off from the vessel, substantially as described.

6. In the main evaporating and compressing pump of a refrigerating or freezing machine, the use or combination with it of an apparatus which injects cold water into its compressing-chamber for the time being, to cool and condense the compressed vapor of the volatile liquid.

ALEXR. C. TWINING.

Witnesses:
KINSLEY TWINING,
S. JULIA TWINING.